3,307,011
METHOD FOR INCREASING ELECTRODE LIFE
Robert J. Baird, Indianapolis, Ind., assignor to Union Carbide Corporation, a corporation of New York
Filed Aug. 29, 1963, Ser. No. 305,337
9 Claims. (Cl. 219—74)

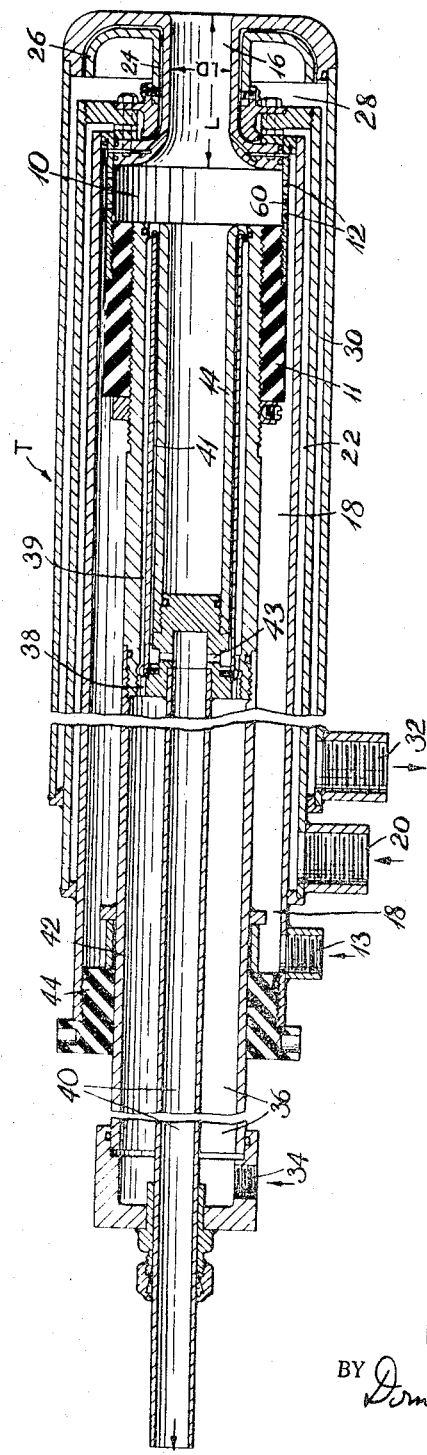

This invention relates to a method for extending the life of electrodes and more particularly to a method for increasing the life of at least one electrode from which an electric arc is sustained.

Electric arcs established between non-consumable electrodes or between a non-consumable electrode and a workpiece electrode have been used for many years for cutting, welding, plating and metal melting. One of the major problems that has continually plagued the industry is that of electrode erosion.

Many solutions have been proposed by the prior art for this problem. Magnetic field coils have been used to rotate the arc and thereby decrease the wear and erosion on the electrode. Elaborate cooling systems have been devised to carry away heat from the electrode. In general, these solutions have been only moderately successful for increasing the operating life of the electrode.

In most instances, the non-consumable electrode is housed in an arc device which generates the arc plasma utilized for the cutting, welding, plating or melting process. Typical arc devices are disclosed in U.S. Patents 2,806-124, 2,858,411 and 3,194,941, and in application Serial No. 178,665, filed March 9, 1962, in the name of R. C. Eschenbach et al now abandoned. The disclosure and description of the apparatus described in the aforementioned patents and patent applications insofar as in necessary for an understanding of the principal of the present invention is incorporated herein by reference.

U.S. Patent 2,806,124 and my application Serial No. 223,484 describe what have become known in the art as "transferred arc" devices. That is, the arc is established between a non-consumable electrode in the device and an electrode workpiece. U.S. Patent 2,858,411 and application Serial No. 178,665 describe typical "non-transferred arc" devices. That is, the arc is struck between a first electrode and a second electrode both being in the torch device. Usually the second electrode is the nozzle in the non-transferred devices. For purposes of this disclosure the term "back electrode" will be used to refer to the electrode housed in a "transferred arc" device and to the first electrode in a "non-transferred arc" device.

It is the main object of the invention to provide a process for minimizing erosion of the electrode in an arc device.

Another object is to provide a process for increasing the life of back electrodes in arc devices.

A further object is to provide a process wherein a carbon-containing gas capable of depositing carbon on the electrode is mixed with a gas inert to the electrode material and the gas mixture is passed through the arc to cause carbon to deposit on said electrodes and thereby increase the life thereof.

A more specific object is to provide a process for increasing the life of a back electrode by introducing a mixture of carbon monoxide and argon in the arc to cause carbon to be deposited on such electrode.

These and other objects will become apparent from the following description of the invention and from the sole figure in the drawings which illustrates typical apparatus for practicing the process of the invention.

The objects of the invention are accomplished by a process wherein an electric arc is established between two eletrodes at least one of which is in an arc device and is composed of material taken from the class consisting of carbon, copper, silver, aluminum, zirconium, molybdenum and carbon steel and passing into said arc a gas mixture consisting essentially of a gas inert to the electrode material and a carbon-containing gas capable of depositing carbon on said electrode.

The invention is predicated on the discovery that gases such as carbon monoxide and hydrocarbon gases such as methane when mixed with a gas inert to the electrode material, will deposit carbon on the electrodes and in some cases rather than having erosion of the electrode the weight thereof is increased.

More specifically, carbon monoxide in an inert gas such as for example carbon monoxide in argon, carbon monoxide in air or carbon monoxide in nitrogen have been used successfully. The term "inert" gas means a gas that is inert to the electrode material being utilized. Other inert gas include helium, neon, xenon, and krypton. Hydrocarbon gases such as methane ($CH_4$) also have been used successfully with an inert gas. Examples of electrode materials compatible to the inventive concept are carbon, copper, silver, aluminum, zirconium, molybdenum and carbon steel.

Referring to the drawing, the torch T exemplifying a device with which to carry out the invention primarily consists of a cup shaped electrode 14 that is in axial alignment with a gas directing nozzle 16 and which is separated therefrom by an arc chamber 10. Chamber 10 is electrically insulated from the electrode 14 by insulator 11. Arc gas is introduced to torch T through inlet 13. From the inlet 13 the arc gas passes through passage 18 down into the chamber 10. The torch T is cooled by passing a cooling fluid from coolant inlet 20 through passage 22 into a second passage 24 formed between the nozzle 16 and member 26. From passage 24 the coolant passes from the torch through chamber 28 and passage 30 and outlet 32.

The electrode 14 is also cooled by introducing a coolant through inlet 34 down passage 36 through passage 38 down passage 39 and back up passage 41 through crosspassage 43 and out passage 40. The outer tubular member 42 which defines the passage 36 also carries means for connecting a power supply to the torch T. Therefore, such member 42 is insulated from the remainder of torch T by insulator 44.

In actual operation, a quantity of a mixture of carbon containing gas such as carbon monoxide and an inert gas such as argon is introduced into chamber 10 through aperture 12 so as to impart a swirling or vortex motion to the gas.

It was discovered that there is a critical relationship of carbon monoxide in inert gas within which the subject process must be carried out. If there is less than 0.5% carbon monoxide present in the mixture, there is an insufficient amount of carbon to form a carbon deposit in the electrode. If there is more than about 5% carbon monoxide in the inert gas, the protective layer of carbon will not form on the electrodes. When the inert gas is argon, a carbon monoxide concentration of 0.5% to 1.0% is preferred as will be described hereafter.

Likewise, when using methane with an inert gas, there is a broad relationship between methane and the inert gas which must be maintained. There should be at least 0.5% methane present to form the carbon deposit and depending on the mode of operation of the arc device, i.e., transferred, non-transferred straight or reversed polarity, the upper limit on the methane varies from up to about 10% to up to about 95% methane. When operating in the transferred mode, the upper limit on methane in argon is up to about 10%, the preferred quantity being 5%. Using 5% methane in argon, a good stable arc was obtained with good carbon deposits on the electrodes. Above about 10%, the arc begins to become unstable.

When operating in the non-transferred mode with alternating current up to 95% methane in argon has been used. The arc was stable and an increase in electrode life was achieved.

The present invention is ideally suited to metallurgical furnaces wherein the heat for carrying out the process is supplied by an arc plasma created by an electric arc established between a non-consumable electrode and the metal to be treated.

Devices similar to that shown in the drawings and in U.S. Patent 2,806,124 are usually used to produce the arc plasma in the furnace. However, the electrode life of electrodes made from copper, for example, has not been satisfactory. The addition of carbon monoxide gas to argon which is the usual arc gas has greatly increased the electrode life as described above. Carbon is usually a deleterious element in a metallurgical furnace. However, it was discovered that concentrations of carbon monoxide in argon of the order of 0.5–1.0% will not affect the melt chemistry while still obtaining the benefit of increased electrode life.

The following examples illustrate the concept and utility of the invention:

EXAMPLE I

*Inert gas plus 5% CO*

In this example an arc torch of the type shown was used in a transferred manner. The electrode workpiece was a carbon steel plate. The rear electrode had a length of 9¼ inches and an I.D. of 1¼ inches. The nozzle had a length of 2½ inches and an I.D. of 1¼ inches. Both the electrode and the nozzle were made of copper. Argon gas containing 5% CO by volume was supplied to the device at the rate of 500 c.f.h. Using single phase A.C. current, 800 amperes were supplied to the device. The arc voltage was 265 v. The chamber pressure was approximately 1 atmosphere.

Under these conditions, the rear electrode showed a gain in weight of about 1.0 gm./hr. Under similar conditions but without the CO addition, the electrode loss is about from 10–20 gm./hr.

EXAMPLE II

*Inert gas plus 5% CO*

The dimensions, gas flow and electrode workpiece were the same as in Example I. Using single phase A.C. current, 1000 amperes were supplied to the device. The arc voltage was 275 v. The chamber pressure was approximately 1 atmosphere.

Under these conditions, the electrode loss was only .041 gm./hr. Thus, by comparing Examples I and II, the upper limit for the carbon containing gas is about 5%.

EXAMPLE III

*CO in air*

In this example, a torch of the type described in application Serial No. 178,665 was operated in a non-transferred manner. Both the rear electrode and the nozzle electrode had a length of 8 inches and an I.D. of 1 inch. Both were made of copper. Air at the rate of 500 c.f.h. and CO at the rate of 5 c.f.h. was fed to the device. With the nozzle electrode acting as the cathode (DCRP), 500 amperes at from 650–725 v. were supplied to the device. The chamber pressure was 25 p.s.i.g.

Under these conditions, the rear electrode had a loss of .112 gm./min. This compares with 1.5 gm./min. for the same torch operating under similar conditions, but with using air only.

EXAMPLE IV

*Co plus N₂*

In this example, a torch of the type used in Example III was operated. Both electrodes were made of copper. The rear electrode had a length of 5 inches and an I.D. of ⅝ inch. The nozzle electrode had a length of 3 inches and an I.D. of ⅜ inch with a ⅛ inch constriction at its exit. Nitrogen at the rate of 600 c.f.h. and CO at the rate of 29 c.f.h. was fed to the device. With the nozzle electrode acting as the cathode (DCRP), from 400–750 amperes at from 380–450 v. were supplied to the device. The chamber pressure varied from 245 p.s.i.a. to 270 p.s.i.a.

Under these conditions, the electrode loss rate was 2½ gm./min. This compares to a loss rate of 5–7 gm./min. when operating the same torch under similar conditions, but using air as the gas.

EXAMPLE V

*CH₄ plus argon*

In this example, a torch of the type shown in the drawings was operated. However, instead of using the rear cup electrode, it was plugged with a carbon block.

Argon at the rate of 200 c.f.h. and CH₄ at the rate of 8.5 c.f.h. was fed to the torch. With the carbon block acting as the cathode, 400 amperes at 232 v. were supplied to the device. The chamber pressure was about 1 atmosphere.

Under these conditions, there was a gain in weight of the electrode at the rate of 0.1 gm./min.

What is claimed is:

1. A method for increasing operating life of an electrode in an arc device for generating an arc plasma which comprises establishing an arc between two electrodes at least one of which is in said arc device and is composed of at least one material taken from the class consisting of carbon, copper, silver, aluminum, zirconium, molybdenum and carbon steel, and passing into said arc a gas mixture consisting essentially of a gas inert to the electrode material and a carbon-containing gas capable of depositing carbon on said electrode.

2. A method for increasing operating life of an electrode in an arc device for generating an arc plasma which comprises establishing an arc between two electrodes at least one of which is in said arc device and is composed of at least one material taken from the class consisting of carbon, copper, silver, aluminum, zirconium, molybdenum and carbon steel, and passing into said arc a gas mixture composed of a gas inert to said electrode materials and a gas capable of depositing carbon on said electrode said gas capable of depositing carbon being taken from the class consisting of carbon monoxide and hydrocarbon gases.

3. Process according to claim 1 wherein the inert gas is taken from the class consisting of argon, helium, nitrogen and air.

4. A method for increasing operating life of an electrode in an arc device for generating an arc plasma which comprises establishing an arc between two electrodes at least one of which is in said arc device and is composed of at least one material taken from the class consisting of carbon, copper, silver, aluminum, zirconium, molybdenum and carbon steel, and passing into said arc a gas mixture consisting essentially of up to about 1% carbon monoxide in argon.

5. A method for increasing operating life of an electrode in an arc device for generating an arc plasma which comprises establishing an arc between two electrodes at least one of which is in said arc device and is composed of at least one material taken from the class consisting of carbon, copper, silver, aluminum, zirconium, molybdenum and carbon steel, and passing into said arc a gas mixture consisting essentially of from 0.5% to about 5% carbon monoxide in a gas inert to the electrode material.

6. A method for increasing operating life of an electrode in an arc device for generating an arc plasma which comprises establishing an arc between two electrodes at least one of which is in said arc device and is composed of at least one material taken from the class consisting of carbon, copper, silver, aluminum, zirconium, molybdenum and carbon steel, and passing into said arc a gas mixture consisting essentially of from 0.5% to about 5% carbon monoxide in argon.

7. A method for increasing operating life of an electrode in an arc device for generating an arc plasma which comprises establishing a D.C. arc between a back electrode and a workpiece electrode, said back electrode being constructed of at least one material taken from the class consisting of carbon, copper, silver, aluminum, zirconium, molybdenum and carbon steel, and passing into said arc a gas mixture consisting essentially of a gas inert to the electrode material and 0.5% up to about 10% methane.

8. A method for increasing operating life of an electrode in an arc device for generating an arc plasma which comprises establishing a D.C. arc between a back electrode and a workpiece electrode, said back electrode being constructed from at least one material taken from the class consisting of carbon, copper, silver, aluminum, zirconium, molybdenum and carbon steel, and passing into said arc a gas mixture consisting essentially of a gas inert to the electrode material and 5% methane.

9. A method for increasing operating life of an electrode in an arc device for generating an arc plasma which comprises establishing an A.C. arc between a back electrode and another electrode, said back electrode constructed from at least one material taken from the class consisting of carbon, copper, silver, aluminum, zirconium, molybdenum and carbon steel, and passing into said arc a gas mixture consisting essentially of a gas inert to the electrode material and 0.5% up to about 95% methane.

References Cited by the Examiner

UNITED STATES PATENTS

| | | | |
|---|---|---|---|
| 1,717,530 | 6/1929 | Thomson | 219—74 |
| 1,935,593 | 11/1933 | Wist | 219—74 X |
| 2,806,124 | 9/1957 | Gage | 219—121 |
| 2,932,721 | 4/1960 | Kooistra | 219—74 |

RICHARD M. WOOD, *Primary Examiner.*